United States Patent [19]

Benton et al.

[11] Patent Number: 5,265,008

[45] Date of Patent: * Nov. 23, 1993

[54] METHOD OF AND SYSTEM FOR ELECTRONIC FUNDS TRANSFER VIA FACSIMILE WITH IMAGE PROCESSING VERIFICATION

[75] Inventors: William M. Benton, Fort Lauderdale; William Mee, Pompano Beach, both of Fla.

[73] Assignee: Moneyfax, Inc., Ft. Lauderdale, Fla.

[*] Notice: The portion of the term of this patent subsequent to Apr. 16, 2009 has been disclaimed.

[21] Appl. No.: 718,471

[22] Filed: Jun. 20, 1991

Related U.S. Application Data

[63] Continuation-in-part of Ser. No. 430,449, Nov. 2, 1989.

[51] Int. Cl.$^5$ .................. G06F 15/20; G06G 7/52
[52] U.S. Cl. .................. 364/408; 235/379; 283/57; 902/5
[58] Field of Search ............ 364/408, 401; 235/379; 902/4, 5, 6, 24, 41; 283/57, 58

[56] References Cited

U.S. PATENT DOCUMENTS

| | | | |
|---|---|---|---|
| 4,151,667 | 5/1979 | Idelson et al. | 283/92 |
| 4,219,599 | 8/1980 | Idelson et al. | 283/77 |
| 4,277,837 | 7/1981 | Stuckert | 364/408 |
| 4,341,951 | 7/1982 | Benton | 364/406 |
| 4,392,675 | 7/1983 | Winiarski | 283/58 |
| 4,454,414 | 6/1984 | Benton | 364/406 |
| 4,513,992 | 4/1985 | May et al. | 283/58 |
| 4,681,348 | 7/1987 | Mowry, Jr. | 283/58 |
| 4,799,156 | 1/1989 | Shavit et al. | 364/408 |
| 4,960,981 | 10/1990 | Benton et al. | 364/408 |
| 4,985,928 | 1/1991 | Campbell et al. | 382/3 |
| 5,122,950 | 6/1992 | Benton et al. | 364/408 |

Primary Examiner—Roy N. Envall, Jr
Assistant Examiner—Laura Brutman
Attorney, Agent, or Firm—Lowe, Price, LeBlanc & Becker

[57] ABSTRACT

In a system for carrying out financial transactions via facsimile machines, account customized transaction vouchers are completed by at least one party to a transaction. The transaction vouchers issued to that party contain thereon in bar code format a series of pseudo random alphanumeric characters with a different set of characters on each voucher. The party transmits by facsimile an image of the completed voucher to a facsimile machine at a central facility. A character reader at the central facility reads the incoming data and authorizes the requested transaction based on the pseudo random alphanumeric set of characters on the voucher when confirmed by a comparison to a list of pseudo random alphanumeric sets of characters in the account record of that party. Used sets of alphanumeric characters are deleted from the list in the account data to permit onetime usage of a voucher. A credit voucher is sent from the central facility to a facsimile machine at the site of the other party to the transaction. This voucher includes a pseudo random alphanumeric set of characters selected from a second list of such characters in the account information of said second party in the central facility. The voucher contains a signature field with a background comprising a repetition of the string of the pseudo-random alphanumeric characters used to identify the voucher as a means to detect unauthorized photocopying of a signature and affixing the same to the signature field on the document.

14 Claims, 15 Drawing Sheets

MONEYFAX PAYMENT VOUCHER

Membership # 000 000 0000 0

Pay To The Order of  P I N O  F R A N C I N I
Name of Moneyfax Member "Payee"

4 1 5   5 7 0   3 8 1 4   7
Moneyfax "Payee" Account Number (Please enter number in duplicate)
4 1 5   5 7 0   3 8 1 4   7

6 0 5 1 2 8 ☐ ☐ ☐ ☐   ☐ Priority
MEMO DATA: Invoice, P.O., "Application of Funds" Number

0 7   1 2   8 9  Date
0 0 0 0   0 0
0 0 0 0   0 0
(Please enter Amount in Duplicate)

0 1 "Currency"

Area For Bank Name

*Signature*

A CREDIT  From
MEMO MONEYFAX

*To the CONFIDENTIAL ATTENTION of ---Pino Francini*
Francini & Associates MF # 415 570 3814 7

From: Larry F. Linden & Associates 301 854 6637 3
Amount of Funds Transfer --- $1000.00
Date: July 12, 1989 Time: 11:55AM
Invoice # 33456756V
New Balance MF Acct # 415 570 3814 7 -- $8850.00

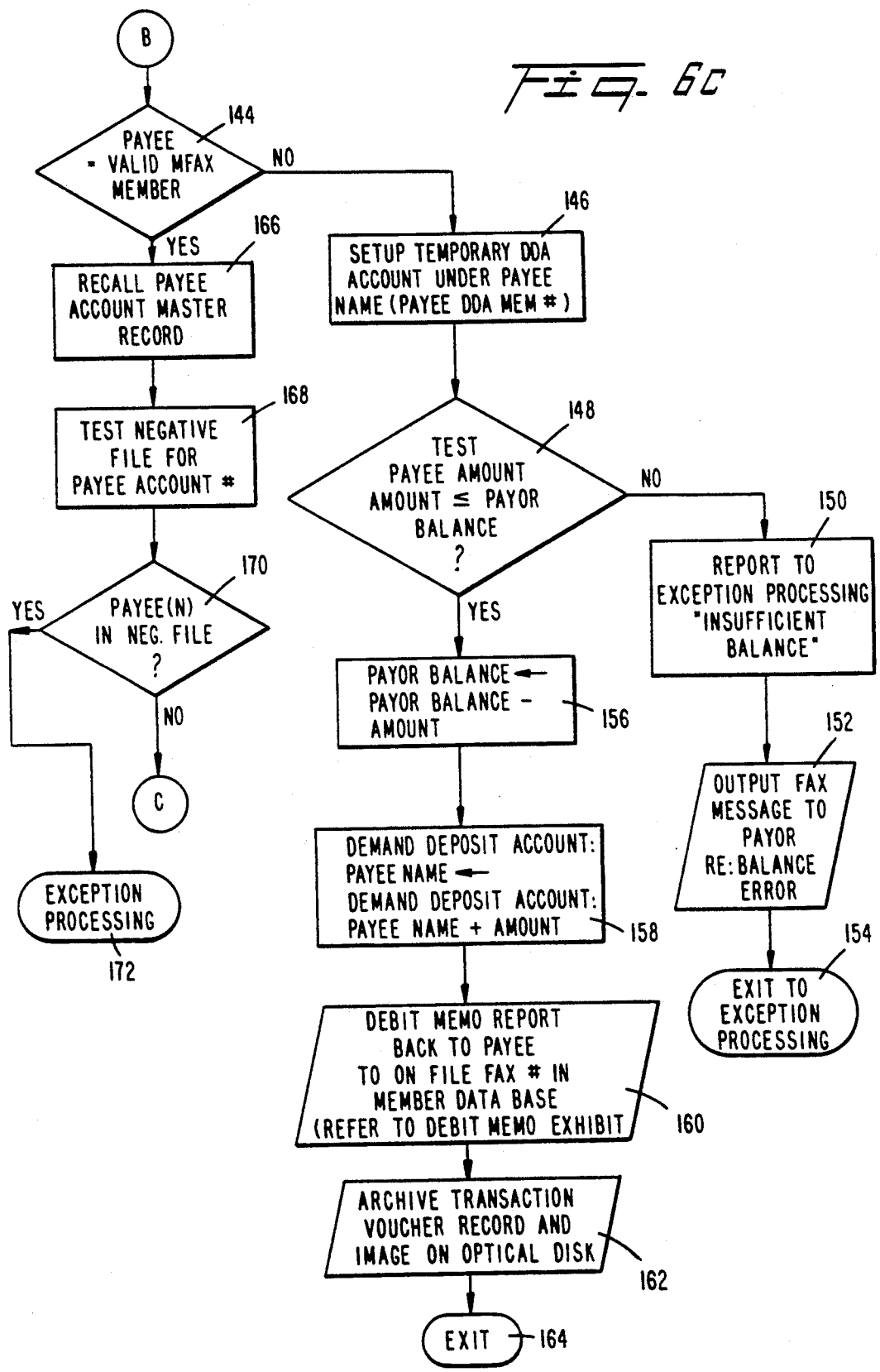

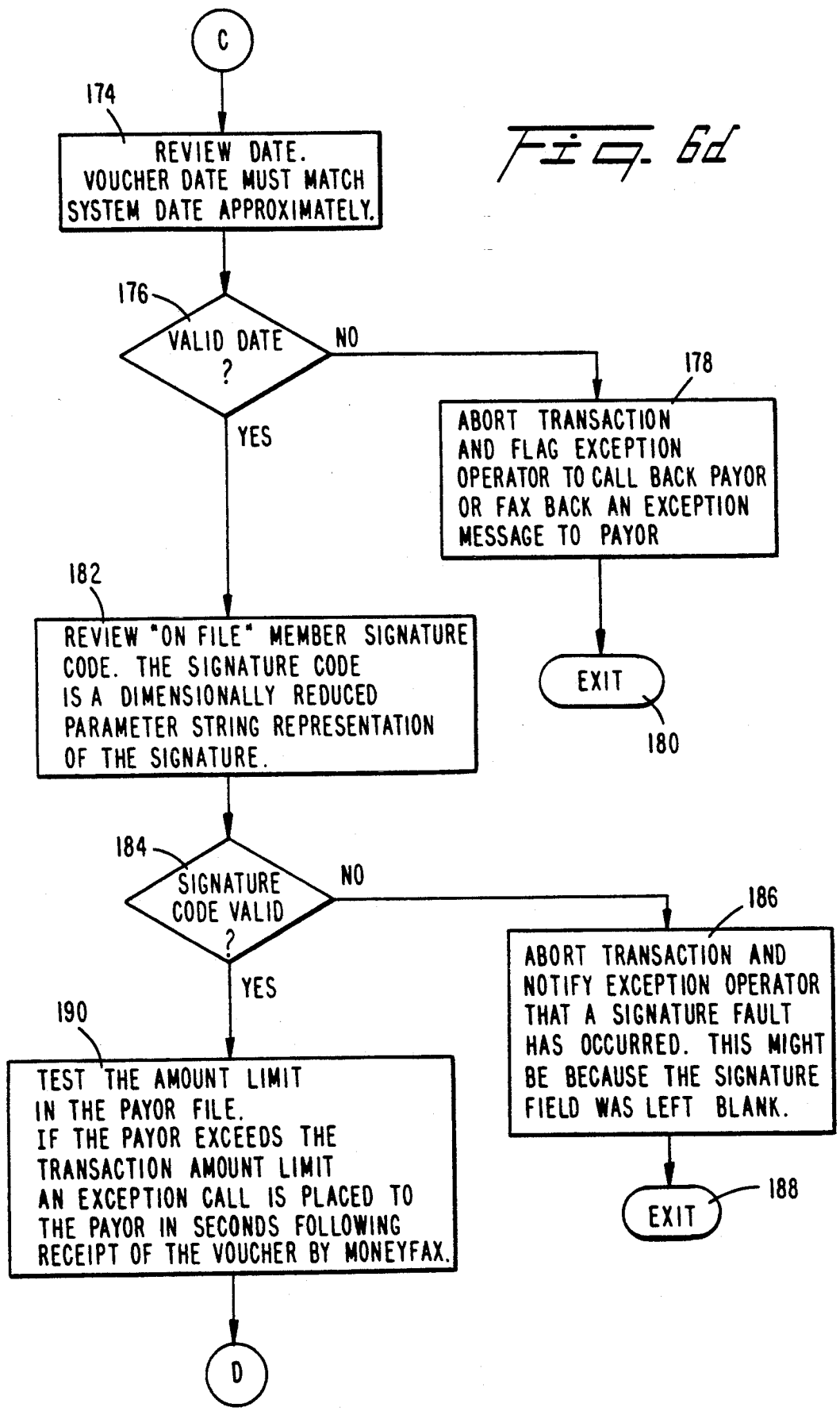

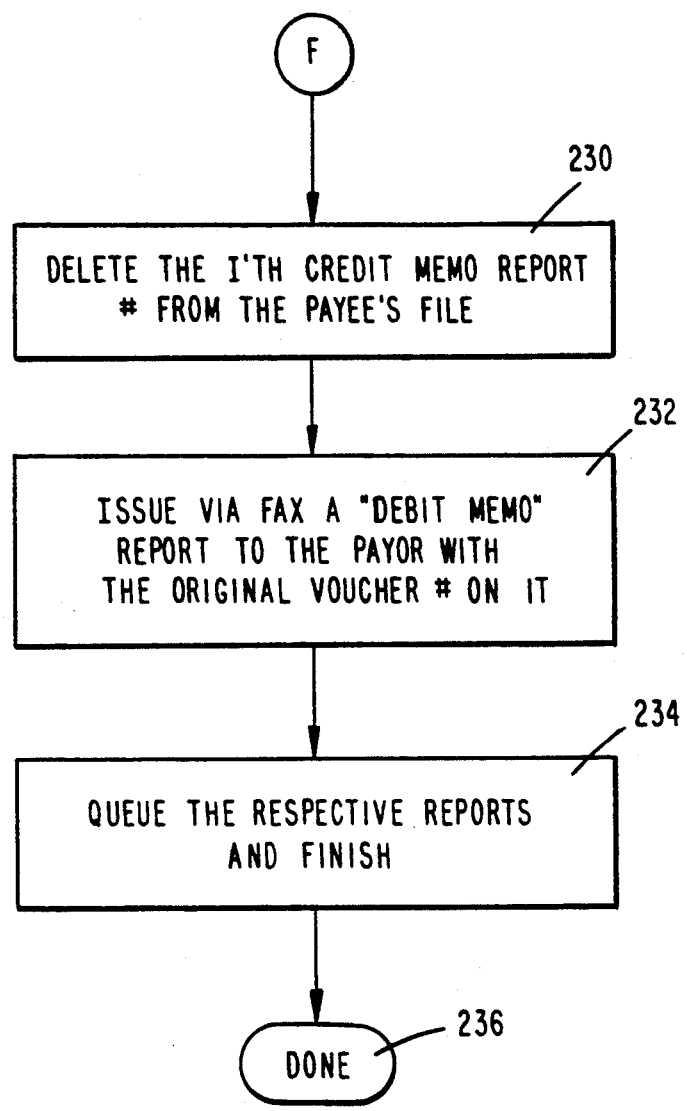

FIG. 7

FORM IDENTIFICATION NUMBER
302 — 
1 2 3 4 5 6 7 9 0 1 2 3 4

Moneyfax Check Number
304 — 
9 0 8 3 6 6 2 8 3 4 3 4 3

Payor Account Number
306 — 
1 2 3 4 5 6 7 9 0 1 2 3 4

Payee's Bank Name/Office
☐☐☐☐☐☐☐☐

Payee Bank I.D (ABA#)    310
☐☐☐☐☐☐☐☐☐

Payee Bank Account Number
☐☐☐☐☐☐☐☐☐☐☐☐

Payee Fax Phone
☐☐☐ ☐☐☐ ☐☐☐☐

Payment Options

ACH (Tomorrow)    ☐

Wire Transfer (Today)    ☐

---

FIRST BANK                              DATE: _____
Your Company Name
PHONE
PAY TO THE ACCOUNT OF:    312
Payee's Name
☐☐☐☐☐☐☐☐☐☐☐☐☐☐☐☐☐

IN THE AMOUNT OF:    $ ☐☐☐☐☐☐☐.☐☐

_____ DOLLARS

MEMO 9083662834343 9083662834343 9083662834343
9083662834343 9083662834343 9083662834343
9083662834343 9083662834343 9083662834343

314
Authorized Signature
Please sign over numerals

---

Complete form and FAX to Bank One Moneyfax Center (305)-555-3344
Confirmation Notice Will Follow Please Enter Your Personal ⟶ ☐☐☐☐ — 316
Identification Number (PIN)

Important - Detach, Obliterate and
Destroy this Pin Strip after Faxing

Fig. 8

Form ID
||||||||||||||||||||||||||||||—318
1 2 3 4 4 5 6

| Date | Notice of Payment in Progress | Time: |
|------|-------------------------------|-------|

From: Your company name
Payorder # 111111111111111
On MM/DD/YY $10000.00 will be debited from your bank account # 111111111111
and will be sent for credit to payee name, bank acct # 111111111
bank Name ABA # 1111111111
pursuant to your payorder.

If you have any problems with this transaction, please contact payor.
Use the following Money fax transaction reference number when making inquires about this transaction:

|||||||||||||||||||||||||||||||||||||||||||||||||||
1 2 3 4 5 6 7 8 9 0 1 2 3 4 5

A copy of your payorder as received is shown below:

FIRST BANK
Your Company Name
PHONE
PAY TO THE ACCOUNT OF:
Payee's Name                                         320

IN THE AMOUNT OF:     $ _____.__

DOLLARS 9083662834343 9083662834343 9083662834343
9083662834343 9083662834343 9083662834343
9083662834343 9083662834343 9083662834343

MEMO

Authorized Signature
Please sign over numerals

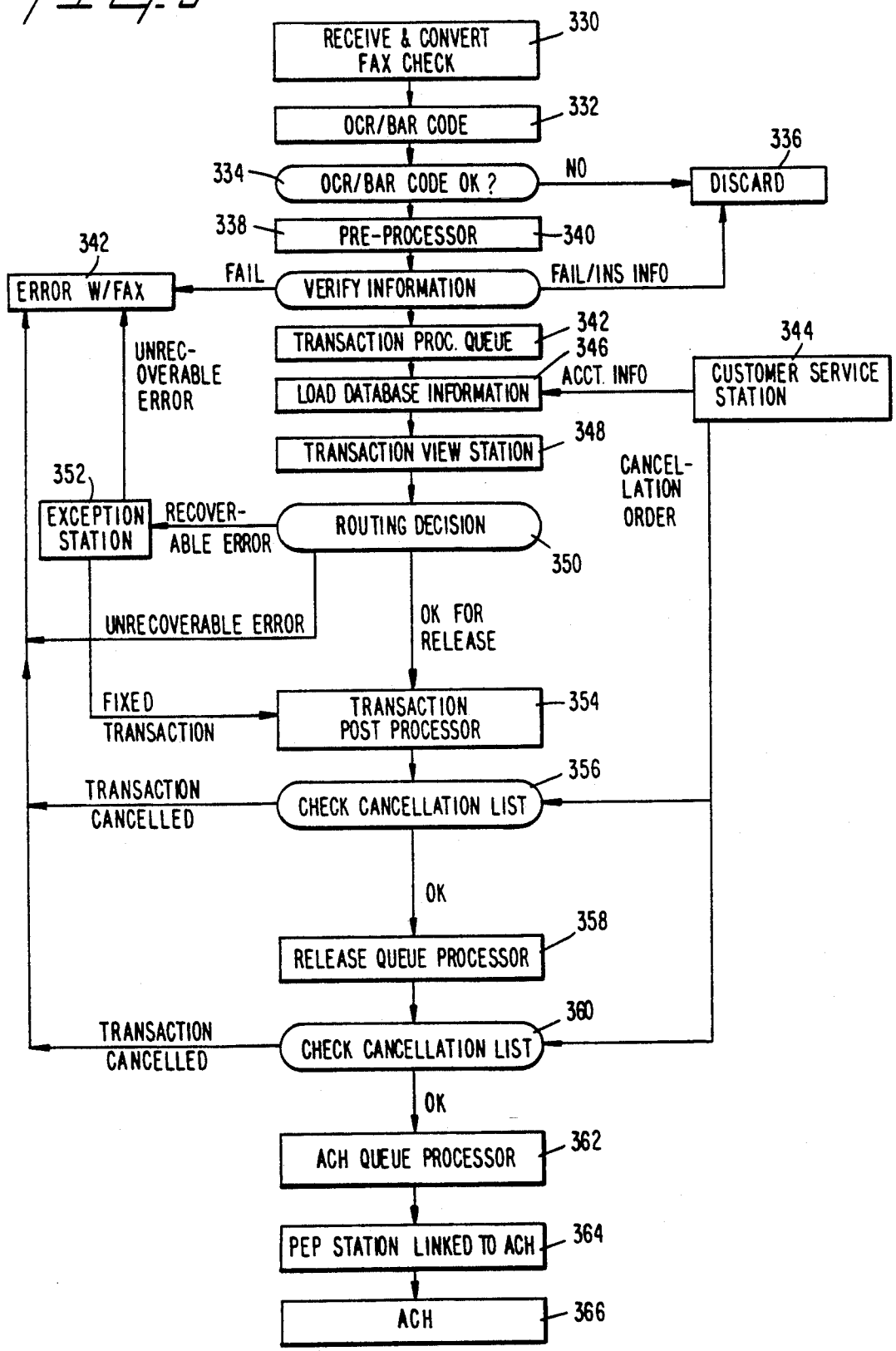

METHOD OF AND SYSTEM FOR ELECTRONIC FUNDS TRANSFER VIA FACSIMILE WITH IMAGE PROCESSING VERIFICATION

CROSS-REFERENCE TO RELATED APPLICATIONS

This application is a continuation-in-part application of application Ser. No. 07/430,449, filed Nov. 2, 1989, for Method of and System for Electronic Funds Transfer via Facsimile Machines.

TECHNICAL FIELD

This invention relates generally to electronic funds transfer systems and more particularly to a funds transfer system using facsimile machines to transfer electronic funds data of buyers and sellers with a unique high level of transaction security.

BACKGROUND ART

Spurred by the pressures of paper-based checking which is costly and time consuming for financial institutions, various electronic and computer based arrangements have been suggested and used in an attempt to perfect electronic funds transfer. Examples of electronic funds transfer techniques that have achieved substantial usage in recent years are the Automated Clearing House (ACH), Automated Teller Machine (ATM), and point of sale system (POS).

To eliminate the presence of a central computer in every transaction, there has been a trend toward off-line electronic funds transfer, that is, transfer of data between portable and resident units, with only periodic downloading of data to a central computer. Mareno U.S. Pat. No. 4,007,355 and Stuckert U.S. Pat. No. 4,277,837 illustrate two examples of such systems. However both systems present problems that have limited their widespread use. In Mareno, no exchange of funds may be made arbitrarily because the cards carried by each user, although having funds data storage capability, have no keyboards and require a special interface apparatus to be present at each transaction. In Stuckert, cards used with the portable terminals have no display; a separate portable terminal must be involved during each transaction. The user cannot continuously monitor his account, limiting the versatility of the system.

These problems and others were solved by Benton in U.S. Pat. No. 4,305,059 issued on Dec. 8, 1981, disclosing a modular funds transfer system wherein each user as well as vendor carries an identical portable module having a keyboard and a display. Funds are transferred between modules using a hard wire interface, and the account status stored in each module is updated following each transaction. In another patent to Benton U.S. Pat. No. 4,341,951, printed vouchers are issued by the portable module following each transaction.

The Benton approach was further refined in U.S. Pat. No. 4,454,414 to provide bidirectional optical coupling between portable funds data transfer modules, including a "hand-shaking" protocol that enables funds transfer to be completed only if a number of criteria are satisfied. These criteria include an identification check following keyboard entry by the user of a secret number and examination of the transaction amount to ensure that it falls within credit limits. In Benton et al. U.S. pat. No. 4,625,276, electronic funds data are transferred between portable modules either directly in a local mode of operation or indirectly, via telephone lines, in a remote mode of operation. Transaction records are printed by an outboard printer or downloaded to a central computer.

The systems described in the aforementioned Benton et al. patents are capable of having a substantial impact on the manner by which financial transactions are carried out, securely transferring funds between buyers and sellers while simultaneously printing supporting documents. However, considerable dedicated apparatus including a modem and printer as well as portable modules are required to implement these systems. In copending application Ser. No. 236,614 to Benton et al., filed Aug. 23, 1988, there is described a modification to and implementation of a conventional facsimile machine to be operative in a transaction mode of operation for carrying out transactions between buyers and sellers.

While generally satisfactory, this Benton et al. system requires modification of existing facsimile machines to interface with the integrated circuit memory modules carried by authorized users. System implementation would be substantially simplified if electronic funds transfer could be carried out through conventional, unmodified facsimile machines. It would also be preferable to clear transactions at the ACH in real time, on line, in a manner consistent with existing funds transfer protocols. Such a system is described in Benton copending application Ser. No. 298,348, filed Jan. 17, 1989.

The Benton system in the '348 application provides a method and system for carrying out electronic funds transfer in real time, via conventional, unmodified facsimile machines using existing electronic funds transfer protocol. In accordance with one aspect of that system facsimile machines located at the sites of the parties to a transaction, e.g., buyer and seller may transmit the contents of a document in bit mapped form to a facsimile machine located at or near a central facility such as an automated clearing house (ACH).

The system includes special transaction vouchers to be sent by facsimile by the buyer and seller to the ACH for clearing. Each voucher has particular regions containing pre-printed information and other regions to be filled in for each transaction including the amount of the transaction.

A character reader associated with the facsimile machine at or near the ACH reads the various regions of the images of the transaction vouchers received by facsimile, formats the images into data recognizable by the ACH and supplies the data to the ACH for transaction clearing.

The ACH stores personal identification numbers (PINs) of parties authorized to carry out financial transactions and compares the personal identification number provided by each party with the stored personal identification numbers to determine whether the parties are authorized to transact within the system. Also stored are account data associated with parties authorized to carry out financial transactions. The ACH compares the amount of each requested transaction with the stored account data to determined whether a requested transaction is authorized.

The ACH sends to the parties, via facsimile, printed reports providing transaction summaries. A first report, following confirmation by the parties that a requested transaction should be carried out, summarizes the details of the pending transaction. Another report is sent to the parties that in effect is a hard copy invoice of the transaction. From time to time, the ACH also sends by facsimile to all authorized users of the system a summary of their account activity.

Other features of the electronic fund transfer system of the '348 application are described in detail in that application which is incorporated herein by reference.

SUMMARY OF THE INVENTION

In any system of funds transfer security is of paramount importance and this is particularly true with electronic funds transfer.

It is accordingly an object of this invention to provide a method and system for carrying out electronic funds transfer with a degree of security believed to exceed that available in using traditional checks.

It is another object of the invention to provide a secure method and system for electronic funds transfer that entails virtually no additional effort by the system users.

It is still another object of the invention to provide such a secure method and system for electronic funds transfer that incorporates a unique safeguard to either or both parties to the transaction.

A further object of the invention is to simplify a transmittal document used in electronic funds transfer while increasing redundancy verification.

A still further object of the invention is to integrate easily each electronic funds transfer transaction into the user's existing internal check filing system.

Yet another object of the invention is to permit determination of whether a payor signature on a transmittal document used in electronic funds transfer is original rather than a copy.

The invention may be briefly described in the context of an electronic funds transfer system of the type described in the aforementioned '348 application. According to the invention, the transaction vouchers in each book of one time use vouchers have printed on their face a string of pseudo-random alphanumeric characters. Along with each book there is provided a machine readable list of the strings of characters on the vouchers which are bound in the voucher book. Each string is randomly different. This list of character strings is transferred by facsimile to the ACH by the bank when a new money facsimile transfer account is opened and/or new vouchers are ordered. The random voucher character strings are entered in the new members file (Member Master File). The account is now activated and the voucher strings or numbers are "valid". No voucher can be used until it is resident in and appropriately activated in the Member Master File. When a voucher is used, that voucher's unique number is then deleted from the file and can never be used again. Truncated vouchers or copies of such are of no value.

In one embodiment, the customer chosen PIN is entered on the voucher twice to assure reliability. The voucher, including both PIN entries, is then transmitted by facsimile with all of the data elements contained on the voucher. The PIN is preferably carried on a PIN strip removably attached to the voucher. The PIN strip is removed after the facsimile transmission and subsequently destroyed. Trucation of this voucher also serves as a visual reminder later that this voucher has been used. The visual comparison of the PIN at host computer level represents a significant reduction in risk.

In a second embodiment, the payor's preprinted check is included as part of the voucher document. The check is easily fastened to a designated portion of the voucher document. The check may be a standard check from the user's normal checking account or a modified version particularly suitable for further simplification of the voucher user entry process. The non-check portion of the voucher document is streamlined. Information linked to a database in the system, including the string of pseudo-random alphanumeric characters, is preprinted in bar code or other optical character recognition format. A removable PIN strip is provided for a one time entry of the PIN number. As a means to prevent photocopying a signature and affixing the same to the signature field on the document, the signature field includes a background comprising a repetition of the string of the pseudo-random alphanumeric characters used to identify the voucher. As this string is unique to the individual document, a photocopy of a signature on such a background or on a plain background, if affixed to a signature field area of a different voucher would be detected as invalid by the system. This feature ensures that the signature field includes an original signature. The above-described signature field may be incorporated into the preprinted modified version of the check affixed to the voucher or, if a standard check is to be used, into the non-check portion of the voucher.

The new security system provides multiple fraud prevention features and is believed to offer an electronic fund transfer system having a degree of security which exceeds that which is inherent in the traditional check system. Other objects and advantages of the invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature and not as restrictive.

BRIEF DESCRIPTION OF THE DRAWINGS

FIG. 3 is a diagram of one embodiment of a transaction voucher used in the system of this invention and filled out by the payor to a transaction.

FIGS. 6(a)–6(g) are a flow chart showing programming of the central computer at the ACH for carrying out the principles of the invention.

FIG. 7 is a diagram of a second embodiment of a transaction voucher used in the system of this invention.

FIG. 8 is a diagram of notification sent to the payor that payment is in progress pursuant to transmittal by payor of a transaction voucher such as shown in FIG. 7.

FIG. 9 is a flow chart showing system operation relative to the embodiment of FIG. 7.

BEST MODE FOR CARRYING OUT THE INVENTION

Figure 1:
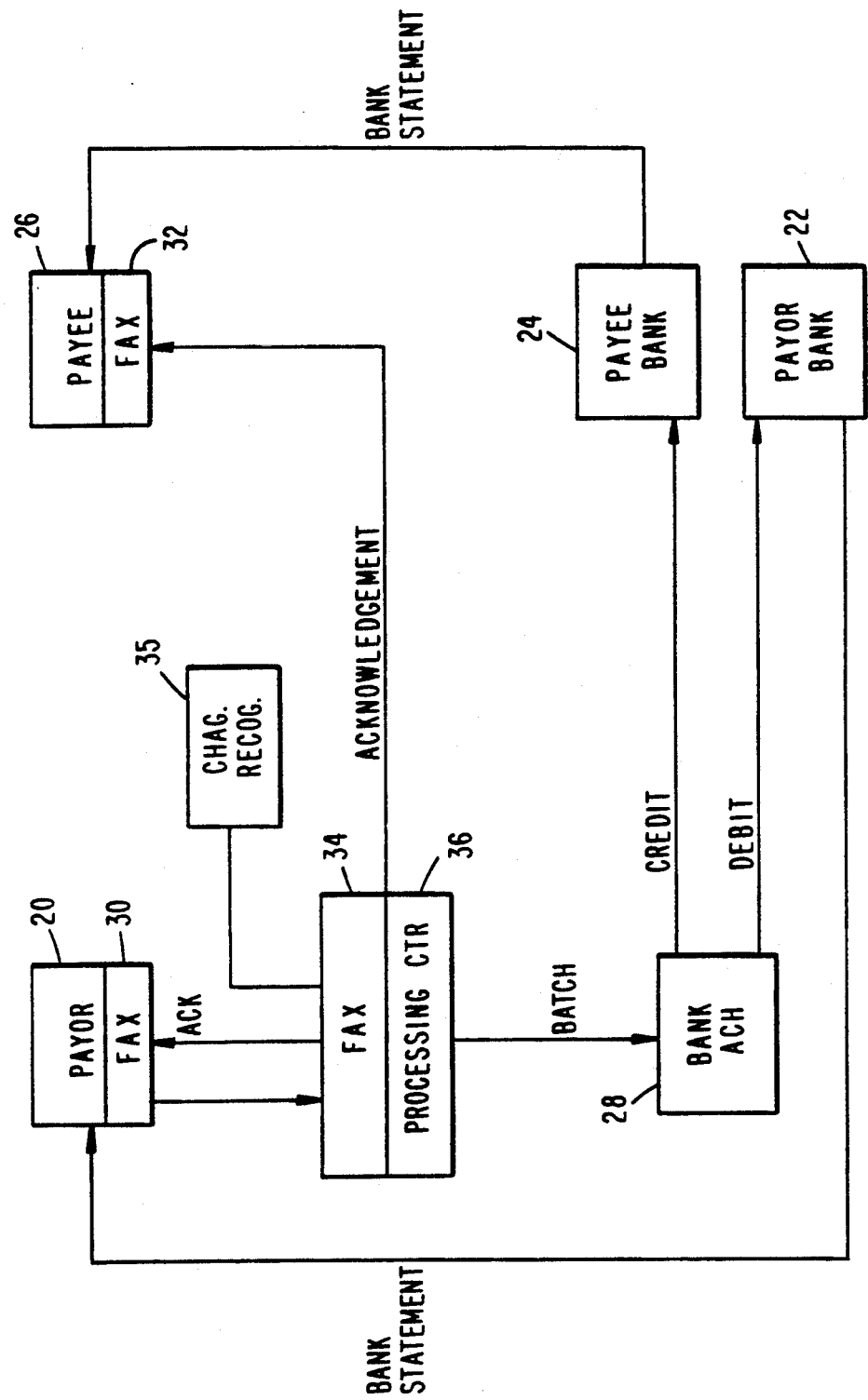
FIG. 1 is a block diagram showing on-line electronic funds transfer with ACH clearing incorporating the general system with which the security features of the invention may be utilized.

Referring to FIG. 1, as an overview of funds transfer between parties in an automated clearing house (ACH) network, a payor 20 will transfer funds from an account in his bank 22 to the account of a payee 26 in payee's bank 24. As an intermediary between the banks 22 and 24 there is an automated clearing house (ACH) 28, which is an association of banks arranged to carry paperless exchanges including posting and clearing transactions, such as direct deposits, preauthorized bill payments, customer initiated entries, corporate transfers and the like. This type of network, being well known in the art since 1972, is not described in further detail herein. The invention to be described in detail hereinafter implements electronic funds transfer using remote facsimile machines 30, 32 at the sites of the payor 20 and payee 26 to transmit images of special transaction vouchers to a local facsimile machine 34 at a central facility 36 preferably at or near the ACH 28.

The central facility 36 uses conventional character recognition equipment 35 to separate text from the incoming voucher image and to encode the text into the proper protocol for processing by the ACH 28. The ACH 28 in turn determines whether the parties are authorized to carry out the transaction, depending upon transmission to the ACH by the parties of correct identification data, and upon confirmation of an adequate balance in the payor's account to support the transfer of funds requested. Of particular importance, written transaction receipts or summaries are sent by the ACH to the parties for confirmation via facsimile.

Facsimiles 30, 32 and 34 are conventional machines capable of CCITT, group III or greater, image transmission. Such facsimile machines, being well known, are not described in detail herein. However, it is helpful, by way of review, to note that conventionally a facsimile machine contains all the necessary electronic capability to function as a "front-end" processor for a centralized automated computation and clearing network as required by the present invention. This capability includes a printer to generate hard copy printout, a document reader having an optical scanner to optically digitize documentary material, a modem to transfer to a communication medium such as telephone lines, binary data at a high baud rate, and a telephone line interface including a dialer to generate DTMF dialing tones and process voice communications. It is important to note, that rather than transmitting the ASCII character representation of documentary material, facsimile machines send the actual document image as a binary encoded, "bit mapped" stream of data. The character recognition equipment 35 at the central facility 36 utilizes a computational algorithm to recognize and reconstruct the textual content of digitized image data, in a manner that is well known to persons skilled in the art.

Figure 2:
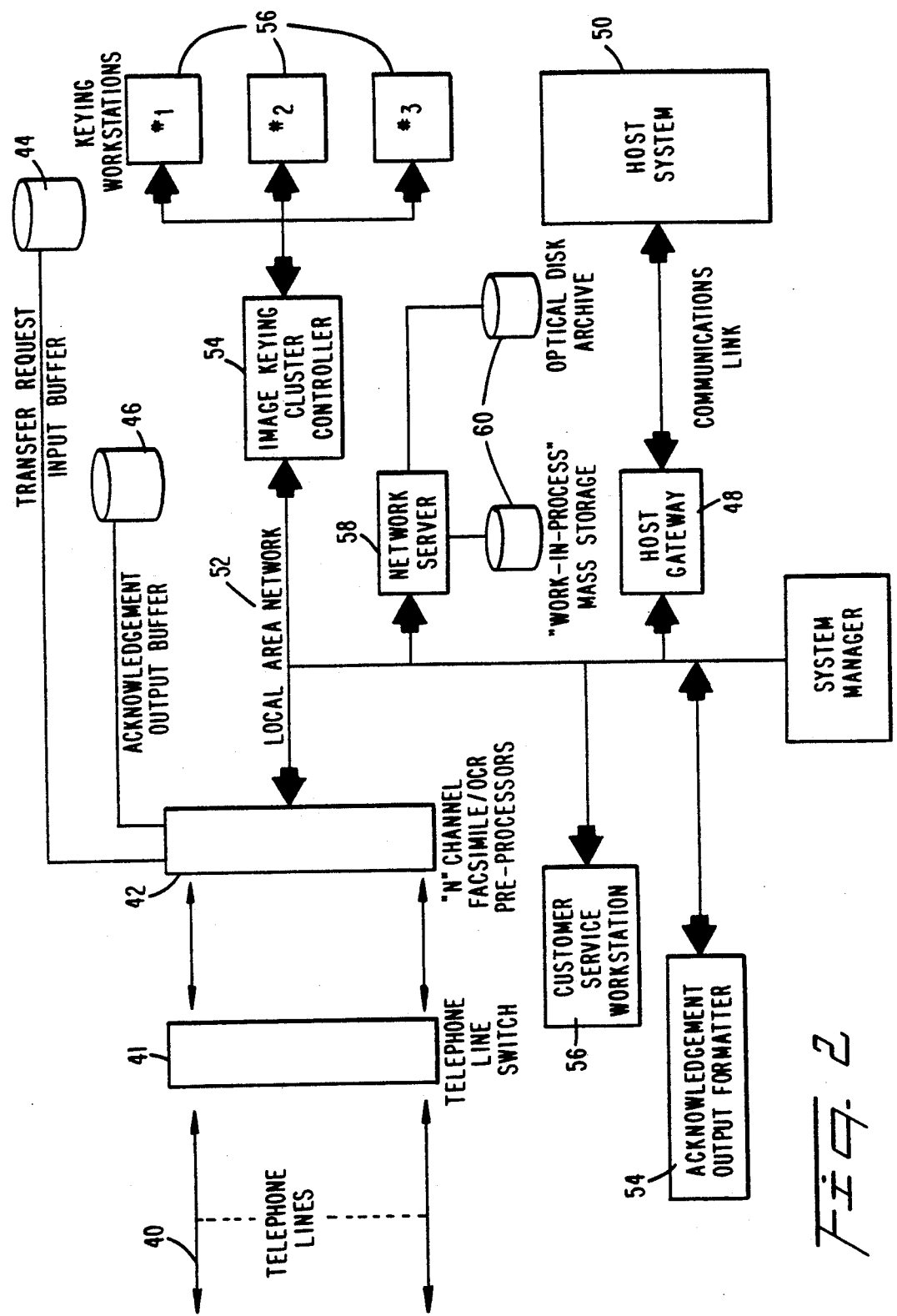
FIG. 2 is a block diagram showing a central image processing system.

Referring to FIG. 2, a plurality of dual-mode telephone lines 40, for example forty lines, and a conventional line switch 41 handle incoming and outgoing communications at the central image processing system. As described, the information is received by a facsimile terminal and certain fields from the voucher undergo an Optical Character Recognition (OCR) process so that key information such as account numbers are automatically known. These steps are performed by a number of Facsimile/OCR Preprocessors 42 which serve as the linkage between telephone lines 40 and the systems electronic communications network. For monitoring and back-up purposes, all of the activity going through the preprocessors 42 are stored on the transfer request input buffer 44 and the acknowledgement output buffer 46.

Typically information from the preprocessors is transmitted to the host gateway 48, which then communicates this information to the host computer system 50 of the financial services organization offering the Facsimile Funds Transfer (FFT) service. The FFT system would then receive notification back from the host computer system as to whether a requested FFT transaction was approved. The host system may be incorporated in the bank ACH 28 of FIG. 1.

There will be a limited number of instances in which FFT requests must first receive human intervention. Requests will be handled by operators on an exception basis—usually when the system senses that a request is unclear or not legitimate. In such cases, information concerning a request would then be transmitted via the systems ethernet network 52 to the image keying cluster controller 54. This controller assigns a specific FFT request to an image keying work station 56. Once an operator at a work station receives a requested transaction the operator goes through a set procedure of verifying and cross-checking the information. In the illustration in FIG. 2 there are three image keying work stations and the average time for a transaction may be less than 15 seconds depending on the amount of information to be keyed. Once a transaction has been approved by an operator at an image keying workstation, the imaging keying cluster controller 54 transmits the necessary information over the network to the host gateway in the same manner followed by requests not routed to image keying workstations.

The response from the host computer system/ACH will indicate whether the request has been approved and will contain certain authorization and support data. This information is then sent over the network to the acknowledgement output formatter 54. Here two facsimile transmissions are prepared. One is a facsimile funds transfer FFT credit voucher that will inform a party that he has received an FFT payment into his account. The second is a transaction confirmation that is sent back to the account that initiated the FFT transaction. Both of these transmissions are then sent over the network to an available pre-processor, which accesses a telephone line and performs the actual facsimile transmission. A customer service workstation 56 permits an operator to handle any administrative and adjustment activities. The network server 58 archives all facsimile information that is received and transmitted on either its magnetic or optical disc memory storage units 60. The system may be staffed by 4–5 employees during peak hours with an off hours staffing of 1–2 persons. The system is designed for simple operation whereby it is possible to utilize low skill level operators.

Referring to FIG. 3, there is shown a sample of a specially drafted transaction voucher 62 which contains in a machine readable format the complete set of information necessary to characterize and clear a transaction. The transaction voucher 62 is customized and preprinted for an individual account and bank and would have an issuing bank name at the area for bank name 64. Similarly a specific and unique membership number would be imprinted upon the voucher at 66. The voucher has a field 68 for receiving by hand written entry the name of the payee, a field 70 and field 72 for redundant entry of the account number of the FFT payee, and a field 74 for entry of an application of funds number. A field 76 receives the handwritten date, while fields 78 and 80 receive a redundant and duplicate handwritten entry of the amount of the transaction. Field 82 is utilized to designate the currency. Field 84 receives the handwritten signature of the party to the transaction. At the right edge of the voucher and attached by perforations 86 is a removable PIN tab 88. The tab 88 contains fields 90 and 92 to receive a redundant duplicate handwritten PIN entry. The tab is removable preventing reuse of the voucher.

A key element of the security system of this invention involves on each voucher a field 93 wherein there is printed on a per voucher basis a unique finite (100 element, for example) collection of pseudo randomly selected 6 or more alpha numeric digits or characters. This series of singular and unique digits is assigned to a members file and at the same time preprinted on the set of vouchers issued to the member. As these are used, the numbers are flagged from the master file. The transmitted voucher number must match the current sequential number in the members master file. The payee's file also contains a similar preselected list. These numbers are assigned to the credit memo voucher transmitted to the payee. The payee then may verify that the credit memo voucher number corresponds to the pre-printed list included in the back of his voucher booklet. This prevents fraudulent sending of funds availability notification to a payee.

Figure 4:
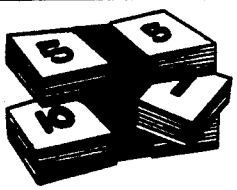
FIG. 4 is a diagram of a credit memo according to the invention.

Turning to FIG. 4, there is shown a sample confirmation credit memo voucher 94 which is transmitted to the payee by the FFT processing center. Obviously, the conformation credit memo voucher must be credible as a bonafide document. The ability to transmit a fraudulent credit memo voucher to a seller could result in the fraudulent verification of funds availability and subsequent release of goods or services. To deter this possibility each credit memo to a particular payee (seller) is preferably sequentially numbered from another sequence of pseudo randomly selected alphanumeric digits. Such a random number is shown in the field 95 in the credit memo in FIG. 4. Thus the originator of a fraudulent credit memo would require knowledge of the list of random numbers as well as the prior sequence of credit memos issued to the particular payee. A facility within the FFT processing center is provided to verify funds availability and to certify credit memos via telephone.

Figure 5:
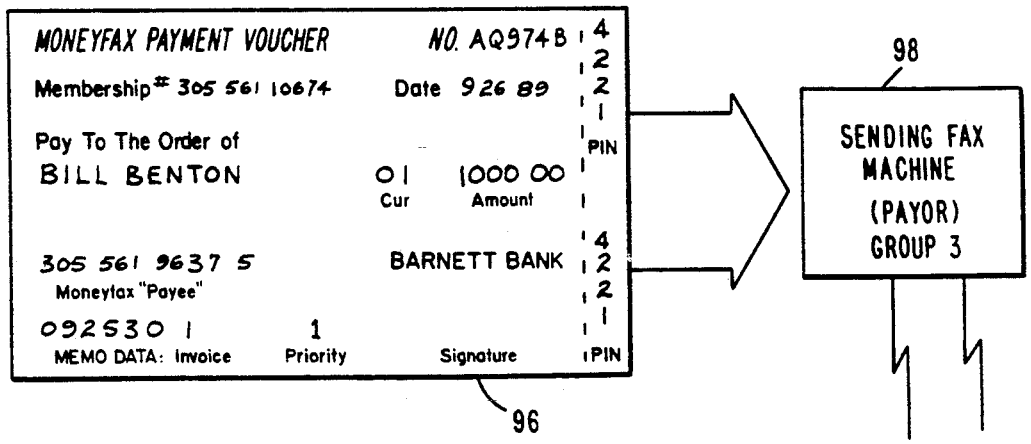
FIG. 5 is a flow chart illustrating the general operation of the system.
Figure 5:
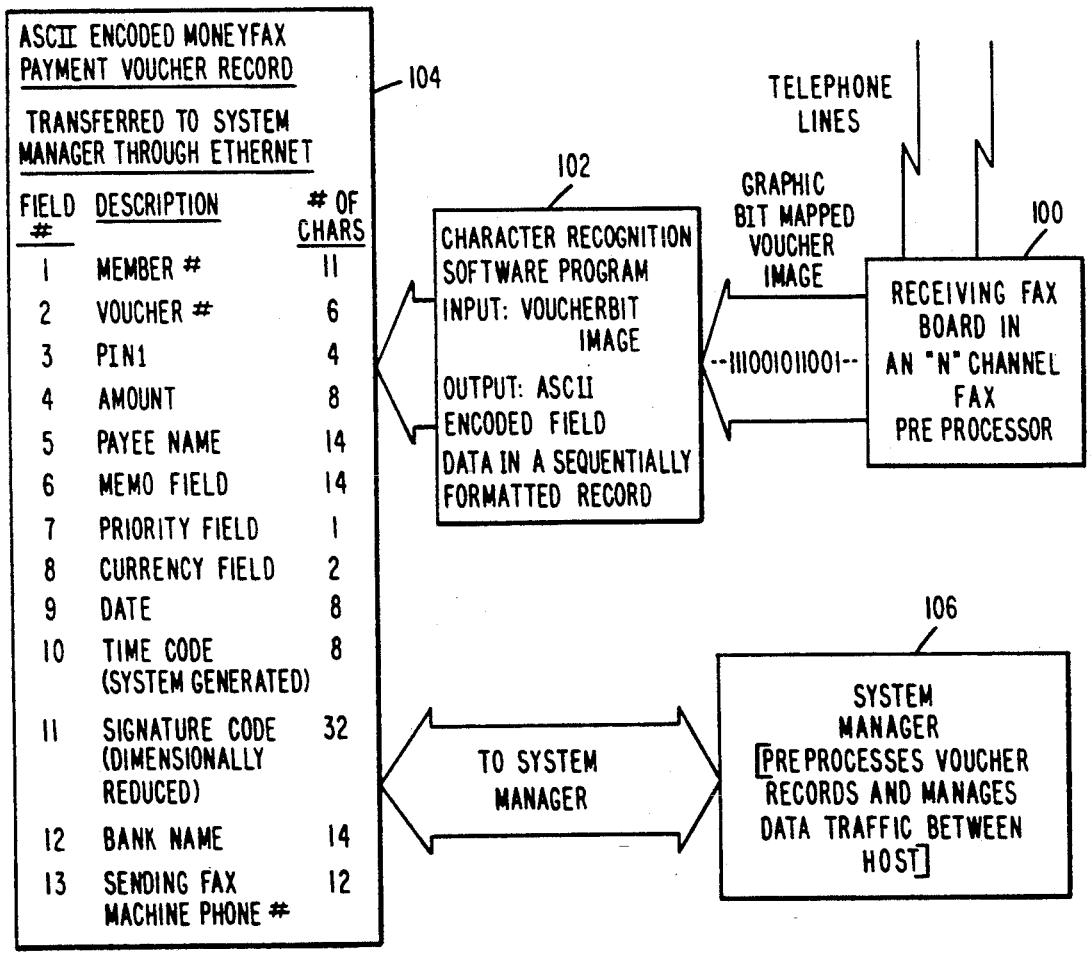

A typical data flow utilizing the system of the invention is illustrated in simplified form in FIG. 5. Referring to FIG. 5 a completed FFT payment voucher 96 is transmitted by a sending facsimile machine 98 to a receiving board in an N channel facsimile pre-processor 100. The graphic bit mapped voucher image is transmitted by the pre-processor to the character recognition software program 102 which outputs an ASCII encoded field of data in a sequential formatted record. This ASCII encoded FFT payment voucher record is transferred to the system manager through the ethernet at 104. The systems manager at 106 pre-processes the voucher records and manages the data traffic to and from the host.

Figure 6A:
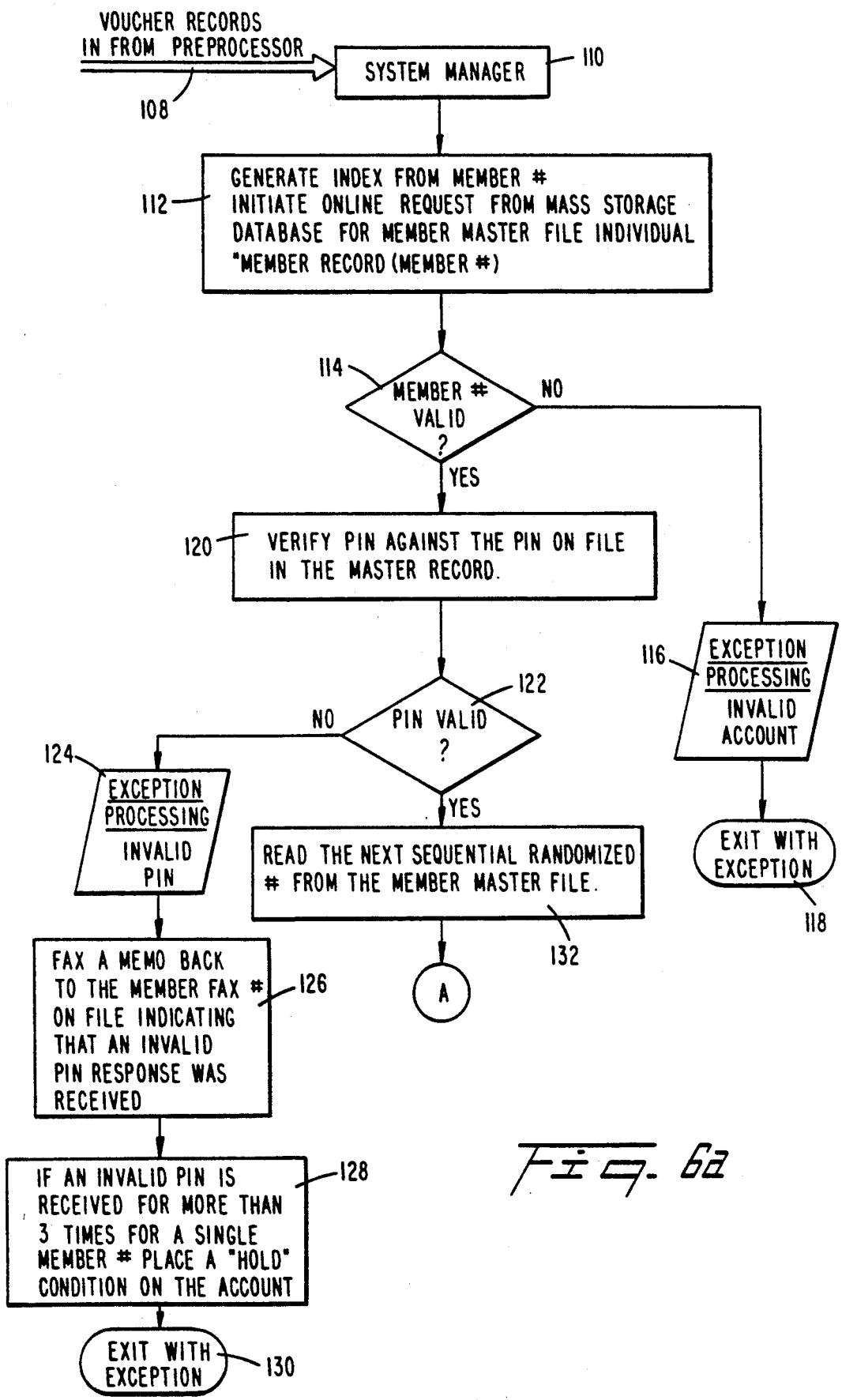

Operation of the system shown in FIG. 5 is now described with reference to the flow chart set forth in FIGS. 6(a)-(g). Referring to FIG. 6(a) the data from an N channel facsimile/OCR pre-processor produced by a voucher such as voucher 62 in FIG. 3 is inputted at 108 to the system manager 110. An index key is now generated from the membership number to initiate an on-line request from the mass storage data base for the individual member master file record (step 112). A membership validity decision is made at 114. If the member account number cannot be validated, the processing is aborted at 116 and exited with exception at 118 with a report to the payor that the account number in the FFT voucher was unreadable or invalid.

If the membership account number is determined to be valid, the program proceeds to step 120 to verify the PIN against the PIN on file in the master member file record. The PIN validity decision is made at 122. An invalid PIN coupled with a valid account number suggests a possible security problem. The invalid PIN is noted and exception processing commenced at 124. A memo is transmitted by facsimile back to the member facsimile number on file indicating that an invalid PIN response was received (Step 126). If an invalid PIN is received more than three times for a single member number a HOLD is placed on the account (Step 128) and the program exited with exception at 130. If the PIN decision at 122 is valid the next sequential random number from the member master file is read (Step 132).

As previously stated, a pseudo randomly selected list of numbers or characters are sequentially printed on each of the 100 vouchers in the set issued to the member. An identical image of this list is maintained in the member master file. As each voucher is used and its assigned random number is evaluated as being a valid number it is then deleted from the list in its order of usage. Thus a voucher can be used only once and never again. The next voucher to be used must contain the next random number in the sequence or else it will be rejected as invalid. The probability of fraudulent guessing of the next number in the list is negligibly small.

Figure 6B:
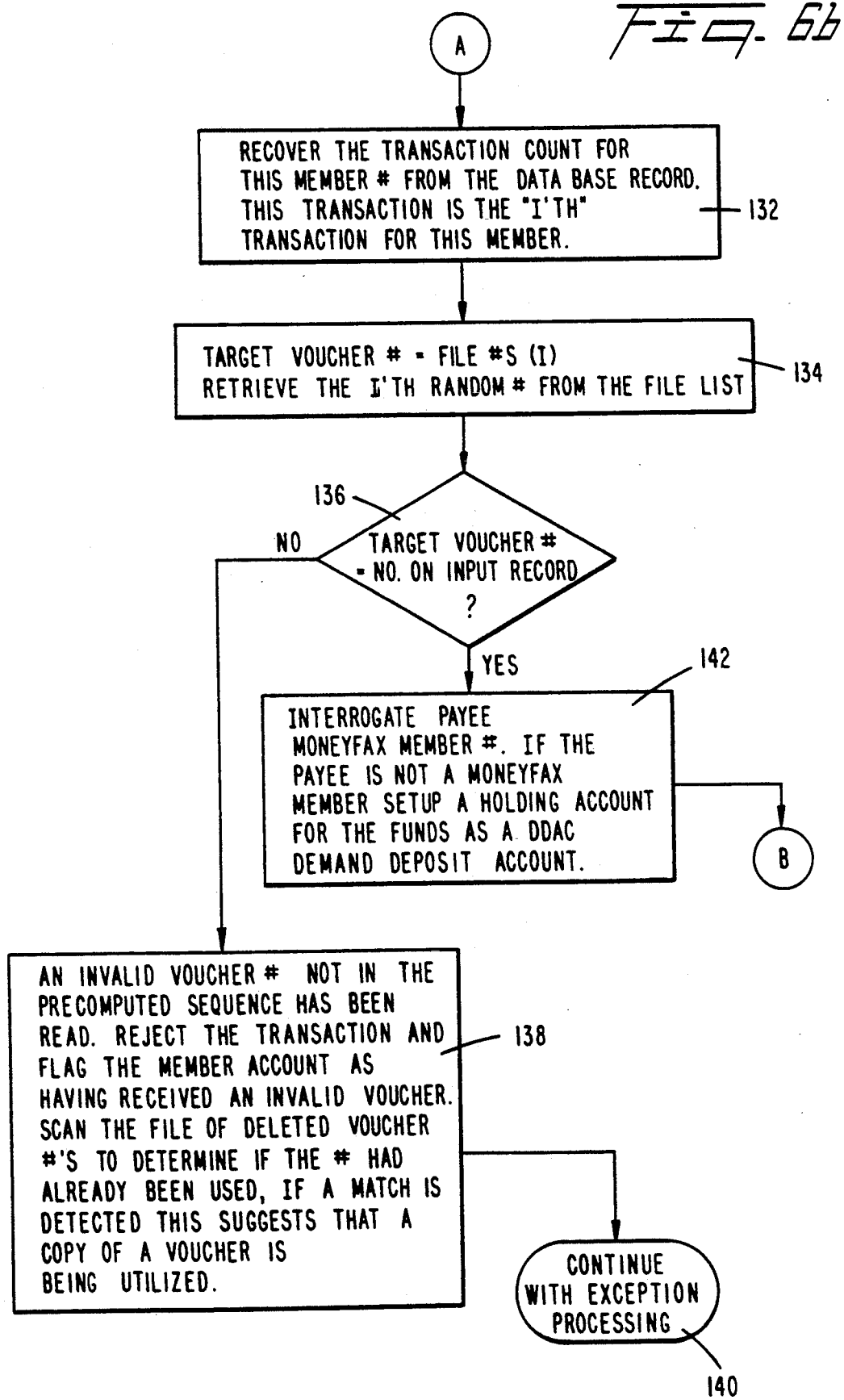

The transaction count for the inputted member number is retrieved from the database record of the member master file (Step 132) FIG. 6(b). The target voucher number is next compared to the number determined by the transaction count retrieval of the random number from the member master file (Step 134). The decision as to the validity of the random number is made at 136. If no correspondence is indicated, i.e. an invalid voucher number is detected, the transaction is rejected and the member account is flagged as having received an invalid voucher. The program next scans the file of deleted voucher numbers to determine if the rejected voucher has already been used. If a match is detected in this search it suggests that a copy of a voucher is being used (Step 138). The program is exited with exception at 140 and an account investigation undertaken for possible fraud or misuse.

If the random number comparison 136 indicates a match a valid sequence number has been obtained. The program next proceeds to interrogate the payee FFT number to determine whether the payee is an FFT member. IF the payee is not a member of the FFT service a holding account for the involved funds is set up as a demand deposit account of the payee (Step 142). This decision is shown in FIG. 6(c) at 144. The set up of a temporary demand deposit account under the name of the payee is indicated at 146. The program next tests whether the payor balance is sufficient to cover the payee amount (Step 148). If the determination is negative an insufficient balance report is made to exception processing (Step 150). An output facsimile message is initiated to the payor (Step 152) and the program exited to exception processing at 154.

If the decision at step 148 is affirmative and indicates that the payee amount is equal to or less than the payor balance, the balance is determined at 156 and the demand deposit account in the payee name for the payee amount is established at 158. A credit memo report to the payee at a payee facsimile number appearing in the member master file is initiated (Step 160), the transaction is then archived in a voucher record, and imaged on the optical disc (Step 162). The program is exited at 164.

Returning to the payee member number validity decision at step 144, if the decision is affirmative to indicate that the payee member number is valid, the program next recalls the payee account master record (step 166). The payee account number is next tested against the negative file compilation (Step 168). If this decision (Step 170) is affirmative to indicate an attempt to transfer funds to a negative account the transaction is aborted and exited with exception at 172. The exception operator is flagged and will call the payors listed contact number.

If the payee account number is not in the negative account file as determined at 170, the program next reviews the actual date against the voucher date for approximate coincidence (Step 174) FIG. 6(d). The validity of the date decision is made at 176. If the difference between dates exceeds the predetermined programed limit, the transaction is aborted at 178. The exception operator is flagged to call back the payor or to facsimile back an exception message to the payor and the program is exited at 180.

If the date is valid or within the programmed difference, the program next reviews the on file member signature code. This comprises a dimensionally reduced parameter string representation of the signature (Step 182). The decision as to the validity is made at 184. If the signature cannot be validated the transaction is aborted at 186. The exception operator is flagged that a signature fault has occurred. This could be because the signature field was left blank. The program is exited with exception at 188. If the signature comparison results in an affirmative answer, thereby validating the signature, the program next tests the amount limit in the payor file (Step 190). If the amount in the transaction voucher exceeds the transaction amount limit an exception is flagged and a call is made to the payor immediately following receipt of the voucher by the FFT service.

Figure 6E:
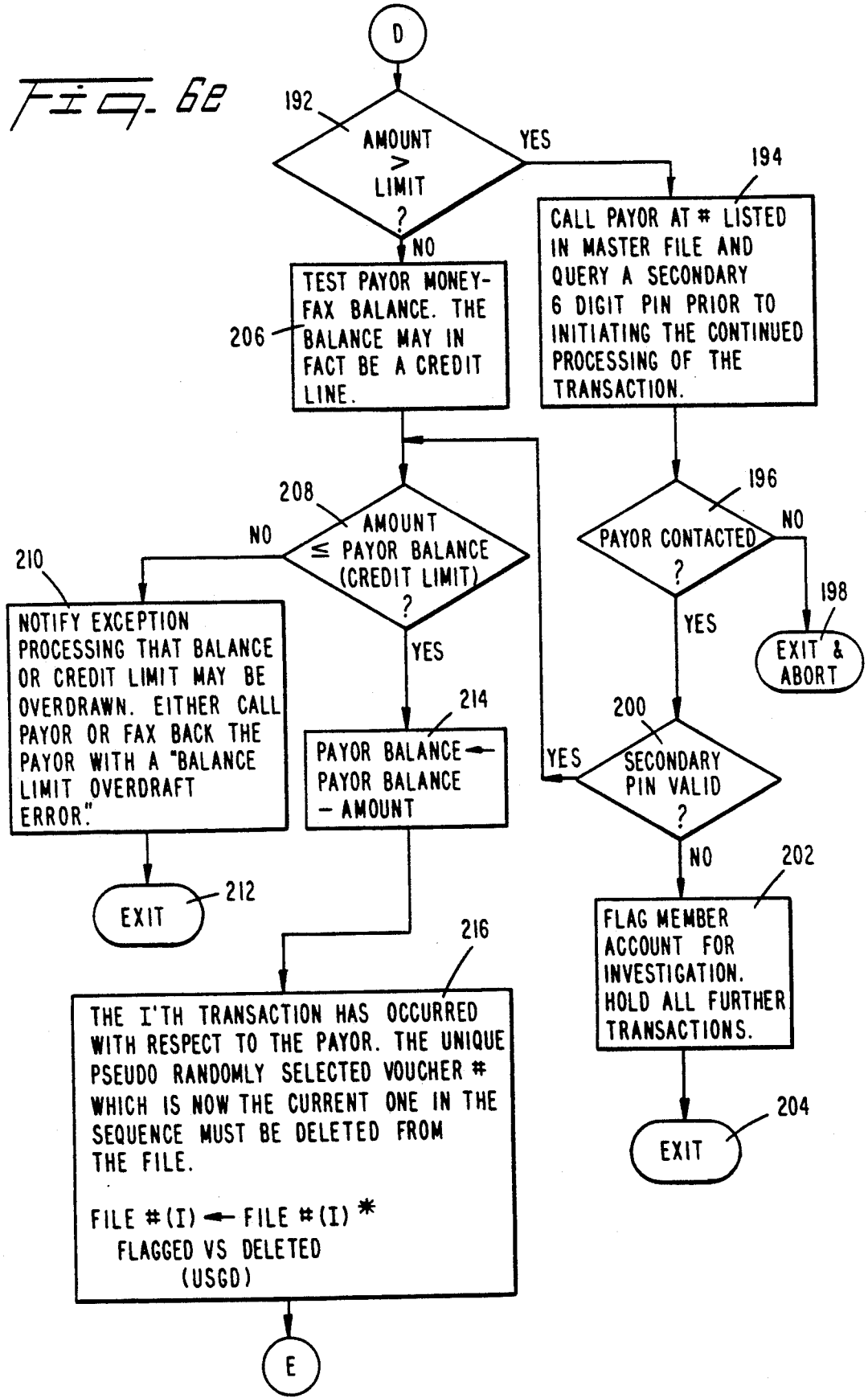

The amount limit decision is made at 192 in FIG. 6(e). As stated, if the amount limit is exceeded, the payor is called at the number listed in the member master file. A query is then made of a secondary six digit PIN prior to continuing with processing of the transaction (Step 194). If the payor cannot be contacted, the program is exited and aborted (Step 196–198). If the payor is contacted (Step 196) a decision as to the validity of the second PIN is made at 200. If the decision is negative and the second PIN is not validated, the member account is flagged for investigation with a HOLD of all further transactions at 202 and the program is exited at 204. If the second PIN validation inquiry at 200 is answered affirmatively, the program proceeds to a further inquiry at step 208 presently to be described.

Returning to the amount limit decision at 192 and to the situation wherein the inquiry is answered negatively and it is determined that the transaction amount does not exceed the amount limit, it is recognized that the balance may in fact be a credit line (Step 206). An inquiry as to whether the transaction amount is less than or equal to the payor balance including the credit limit is made at 208. If the transaction amount is not less than (exceeds) the payor balance (credit limit), exception processing is flagged at 210 to indicate that the balance or credit limit may be overdrawn. The payor is either called if such a service is indicated in the payors member master file or there is a facsimile communication back to the payor with an indication that there has been a balance limit overdraft error. The program is exited at 212.

If the decision at 208 indicates that the amount of the transaction is less than the payor balance (credit limit) the payor balance is debited at 214. The program next notes the use of the pseudo randomly selected voucher number involved in the transaction and flags that number as used or deleted (Step 216).

Figure 6F:
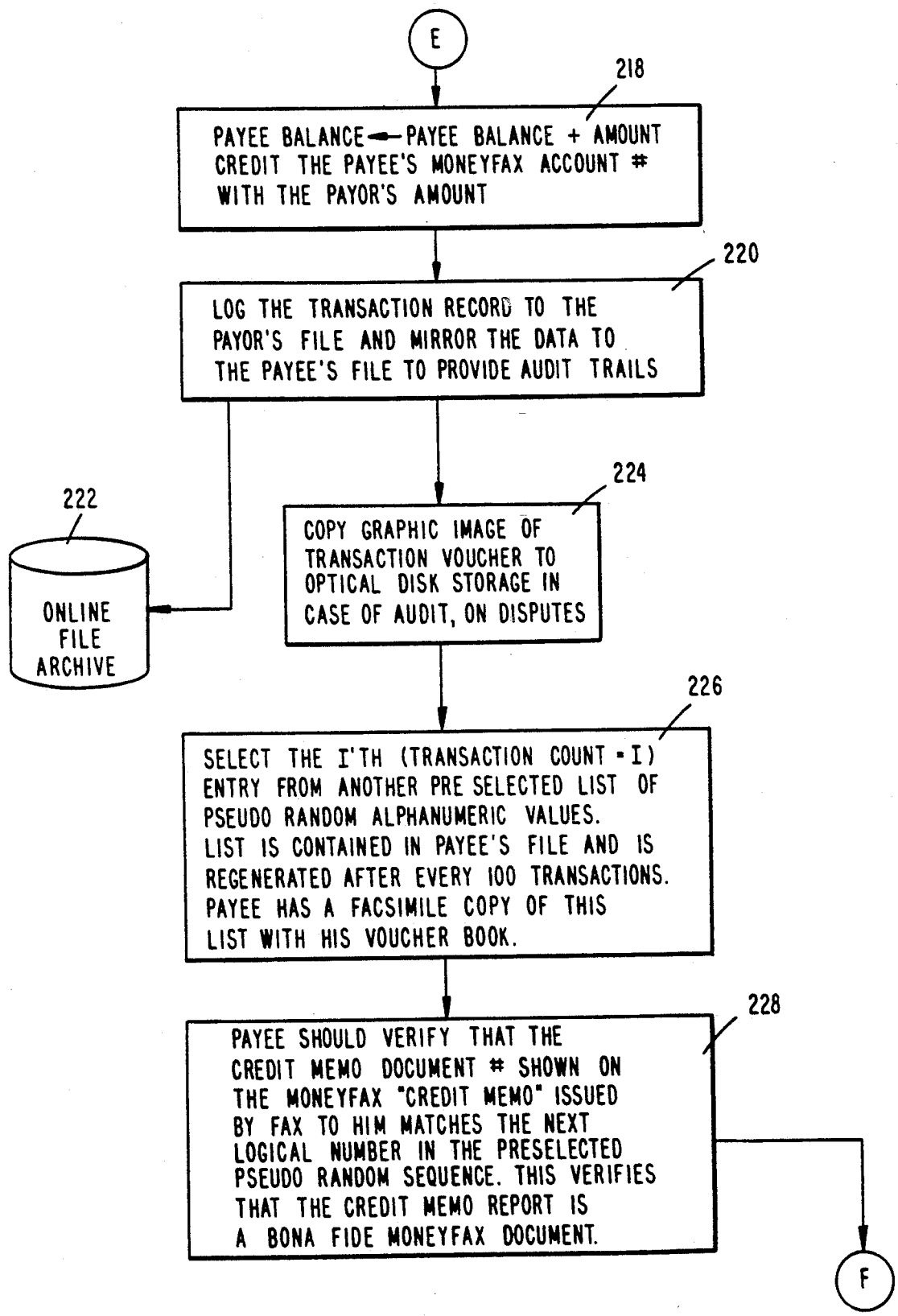

Referring to FIG. 6(f), the payees FFT service account number is credited with the transaction amount (Step 218). The transaction is logged to the payors master member file and the data is mirrored to the payees master member file to provide audit trails (Step 220). The data is archived at 222. A copy of the graphic image of the transaction voucher is forwarded to the optical disc storage for purposes of audit or dispute (Step 224).

As explained previously, the payee may be provided with a list of pseudo random alphanumeric characters or credit memo digits corresponding to the number of his transactions with this specific payor. The same list appears in the data in the payees master member file. The program now selects the next pseudo random alphanumeric set of characters from the payees credit memo file list (Step 226). This number is known to the payee by reference to his corresponding list and his knowledge of the number of transactions with this payor which have transpired previously, e.g., he knows the number of this transaction. The payee then verifies that the credit memo document number shown on the FFT credit memo issued by facsimile to him (such as the memo of FIG. 4) matches the next sequential number in the preselected pseudo random sequence. This verifies that the credit memo report is indeed a bonafide FFT service document (Step 228).

Referring to FIG. 6(g), the program next deletes the credit memo report number form the payees file list of pseudo random credit memo numbers (Step 230). A debit memo is then issued via facsimile to the payor with the original voucher number (Step 232). The respective reports are queued and the program is finished (Step 234 and 236).

Referring to FIG. 7, a second embodiment of a transaction voucher is illustrated. A form identification number is shown at 302 as a bar coded numeric field, used by the system to determine the type of incoming document. Based on this determination, proper routing is performed. The form identification number also serves as a batch control number and would change with each batch of, for example, fifty checks. The batch number is linked by the system database to the payor's system account number.

Check number 304 is a bar coded numeric field containing a random number generated by the system. This number is unique to the individual check and corresponds to the number 93 of FIG. 3. A random check number is generated for each check in the batch and associated in the system database with the batch number at the time of creation of the batch. The check numbers are thereby assigned to the payor's account. The payor's actual bank account number within the host bank is represented as a bar coded numeric field at 306. The above described bar coded numeric fields 302, 304 and 306 are preprinted on the checks before being received by the payor.

The remainder of the transaction voucher contains fields to be entered by hand by the payor. Area 310 is directed to payee information and payment options. Inclusion of both payee's bank name and identification number provides an additional level of validation as the system online database permits a comparison and reconciliation thereof.

The lower portion of the voucher includes a preprinted document, very similar to a conventional personal check. A hand written copy of the payee name, transaction amount and date are entered in the designated areas in much the same fashion as a check. The signature field box 314 surrounds an area wherein the randomized check number has been numerously reiterated. The authorized payor signs within this field. The random number background prevents a copy of a previously signed signature field, which may easily be pasted over a signature field area, from use as authorization of a subsequent funds transfer.

As an alternative to the check area of the voucher being pre-printed, the payor's actual check may be used and affixed to this area. In such instance, the voucher would include an additional signature field, with reiterated random check number background, in another area of the document. A removal PIN strip, for a single entry of a PIN number, is provided at 316.

Both of these voucher alternatives offer increased convenience and advantages to system users. The original voucher, including the check number and amount strip, is filed with the payor's other cancelled checks, requiring no change of the payor's internal check filing system. The payor can manage his check register in his traditional manner. The transmittal document to which a check is attached becomes a customized document with an authentic check image faxed through to the payee. The used transmittal document would be filed as a reference source if the payor needs to transfer funds to the same payee at a future time. The document would not be confused with an active one because the PIN strip would have been removed. Redundancy is increased; the amount field is now presented to the system three times, once in the blocked area and twice in the traditional manner on the check.

When a voucher has been transmitted by facsimile for processing, the randomized check number is flagged as having been used and future use of a document with this number is prohibited. Unauthorized interception of such a voucher would be harmless for future use as the number would be recognized by the system as being invalid. An attempt to affix a different check number would be difficult as well as unlikely of success due to the unpredictability of a valid check number.

Upon processing a received facsimile voucher transmission, the system transmits by facsimile back to the payor notification of payment in progress, an example of the form thereof shown in FIG. 8. Such notification serves as a means for informing the payor that the voucher has been received by the system, for verifying that the received voucher information is in accordance with the payor's requirements, and as a means for the payor to order cancellation by return facsimile transmission to the system. A bar coded numeric field is provided at 318 for form identification. A copy of the check portion of the voucher is included at 320. When the return facsimile transmission of the payor notification is received by the system, it is immediately identified as a cancellation order and is routed appropriately to the proper workstation.

The system may be expanded to include provision for member requests with corresponding appropriate forms. Data requests can be implemented by providing a menu of banking information selections including, for example, balance inquiry, cleared deposit inquiry and wire transfer funds available inquiry. The system would recognize the type of request from the form identification number field.

With reference to the flow chart of FIG. 9, operation of the system relevant to the embodiment of FIGS. 7 and 8 is illustrated. At step 330 a facsimile transmission of a payor voucher such as shown in FIG. 7, containing the appropriate information, is received. For this purpose a facsimile server station is provided for sending and receiving facsimile images. The station has the ability to convert group three facsimile images to group four level compression.

At step 332 character recognition and bar code reading is performed. A computer is provided to execute a program for character recognition in accordance with a stored reader neural network software library. The program also performs translation of the 3 of 9 bar code into numeric strings. Any necessary image enhancement and mark/sense feature location tasks are performed.

At step 334 a determination is made whether the optical image can be read. If the bar coded fields are not recognizable, the transaction is aborted and the input is discarded at step 336.

At step 338 validation processing is undertaken of the bar codes, payorder number, payor bank account number and PIN number. In the event of error or other incorrect information determination at step 340, the pre-processor will automatically send an error message facsimile transmission to the payor (step 342), if there is sufficient information to identify the payor; a failure determination with insufficient payor identification information results in discarding the image (step 336). Upon successful verification at step 340, the transaction is held in a transaction processing queue (step 342).

At step 346, database information relative to the payor and payee accounts is loaded from the customer service station 344. Indication of receipt of a cancellation notice will also be input. The customer service station includes a computer for handling customer account setup, inquiries and transaction cancellations.

At step 348 data is viewed by an operator at an image display station. The operator will validate the OCR fields and sufficient funds. If a vendor list is specified in the customer account database, the operator can verify the payee against the approved list. The operator has three choices for routing the transaction, as indicated at step 350. If the transaction is to be aborted, processing will be terminated with a facsimile error message transmitted to the payor (step 342). If the transaction includes an exception that may be recoverable it is further processed at an exception station (step 352). If the exception station is unable to recover the correct information, the exception processing of the transaction is terminated and a facsimile error message is transmitted to the payor.

If the operator at the image display station determines that the transaction is acceptable, that transaction, as well as any transaction that has been corrected at the exception station, is released to the transaction post processor 354. The transaction is then checked (step 356) against a transaction cancellation list generated by the customer service station and, if it is not to be cancelled, the transaction is released to the queue processor 358. In the event of a cancellation, the transaction will not be placed in the queue and a facsimile message is sent back to the payor (step 342). A similar check is again made at step 360 prior to ACH queue processing at step 362. Processing is performed by a computer which is connected to the DEC NET. The unit will run the Paperless Entry Processing (PEP) software package which is used by over 80% of the ACH member banks 366 to manage ODFI and RDFI (Originating/Receiving Depository Financial Institution) tasks.

Conclusion

There has been described a method and system for transferring funds, on-line, between accounts using facsimile machines that are conventional and unmodified. This is accomplished according to the invention with a degree of security which exceeds that available in the conventional use of checks. This is made possible by special vouchers containing account numbers for payor and payee, a PIN number, a signature, and most particularly a pseudo-randomly selected alphanumeric serial number known only to the payor and stored in machine language in the transacting institution. In like fashion, the payee is provided with a credit memo possessing a similar measure of security. Thus the credit memo contains the member account numbers of the payor and payee in addition to a second pseudo random alphanumeric serial number known only to the payee and stored in the data bank of the transacting institution. Thus the payee also has his own unique protection against the issuance of fraudulent credit memos.

In this disclosure there is shown and described only the preferred embodiments of the invention, it being understood that the invention is capable of use in various other combinations and environments and is capable of changes or modifications within the scope of the inventive concepts as expressed herein.

What is claimed is:

1. An electronic funds transfer system for carrying out financial transactions between parties to a transaction, comprising:

a transaction voucher having a region for containing at least the amount of a transaction, an account number, a pseudo random alphanumeric set of characters and a signature region including a background of repeated strings of said set of alphanumeric characters;

at least one remote facsimile machine at a site of one of said parties for transmitting images of said transaction voucher;

a central facsimile machine located at a central facility for receiving incoming images sent from said at least one remote facsimile machine;

a central computer means associated with said central facility and means for formatting incoming images of transaction vouchers into a form recognizable by said central computer means;

said central computer means including means for processing a transaction associated with images of a transaction voucher and means for authorizing the transaction based upon the image of said pseudo random alphanumeric characters received from said at least one remote facsimile machine.

2. A funds transfer system according to claim 1 wherein said central computer means further includes means for associating a bar coded set of characters on said voucher with a list of pseudo random alphanumeric characters carried by a set of transaction vouchers issued to a funds transfer account holder; and means for comparing a predetermined set of said alphanumeric characters in said list with the alphanumeric characters in the image of said transaction voucher.

3. A funds transfer system according to claim 1 wherein said signature region of a transmitted voucher image includes a signature of a maker of said transaction voucher over said background;

said central computer means further comprising means for matching signature data of the received voucher image, representing both signature image and said background, with stored signature data; and means for activating said means for processing if a match has been performed by said means for matching.

4. A funds transfer system according to claim 3 wherein said transaction voucher further includes a region for entry of a personal identification number (PIN) and being detachable from the remainder of said voucher to permit removal therefrom after the image of said transaction voucher is sent to said central facsimile machine to prevent reuse of said voucher;

said transaction voucher being issued to an electronic funds transfer system account holder having an account file stored in said central computer means, said account file for said member including an account number, said signature data, said PIN and said list of pseudo random alphanumeric characters;

a transaction being authorized for said member by said means for authorizing by matching the stored pseudo random characters with the voucher image as well as by matching said stored account number, stored signature data and stored PIN data with corresponding data in the voucher image.

5. A funds transfer system according to claim 4 including means to delete or void the alphanumeric character is said list after matching with said image to clear a transaction.

6. A funds transfer system according to claim 4 including means for cancelling a transaction in response to transmission of a facsimile request by said member.

7. A funds transfer system according to claim 3 wherein said transaction voucher further includes a check portion for entry of data including date, payee, amount and signature.

8. A funds transfer system according to claim 7 wherein said check portion includes said signature region having a background of repeated strings of said set of alphanumeric characters.

9. A funds transfer system according to claim 7 wherein said check portion comprises a check from a checking account of said maker and affixed to said voucher.

10. A funds transfer system according to claim 1 wherein said set of alphanumeric characters on said voucher is patterned in bar code format.

11. A method of carrying out financial transactions between parties in an electronic funds transfer system, said parties comprising a payor and a payee, having at least one remote facsimile machine at a site of one of the parties to the transaction, a central facility having at least one central facsimile machine for receiving images transmitted thereto from said at least one remote facsimile machine, the central facility including a central computer having means for storing account data associated with the parties to the transaction and means for clearing financial transactions based upon the account data and the image data received on-line from at least one of said parties to a transaction, comprising the steps of:

using said remote facsimile machine, transmitting to the central facility an image of a transaction voucher having regions containing the amount of the transaction, an account number, a pseudo random alphanumeric set of characters and a completed check of the payor; and clearing the transaction based on information contained in the voucher images received by the central facility and on account data stored at the central computer.

12. The method of claim 11 wherein the account data stored at the central computer includes a list of pseudo random alphanumeric characters assigned to an account, and further including the step of deleting or voiding a set of alphanumeric characters in said list when said set has been used to clear a transaction.

13. The method of claim 11 wherein said step of transmitting comprises transmitting an image of a signature of the payor on a background of repeated strings of said set of alphanumeric characters and said step of clearing comprises matching the transmitted signature and background with corresponding data stored in the central facility.

14. The method of claim 11 further comprising the step of cancelling a transaction prior to completion in response to transmission of a facsimile request received from said payor.

* * * * *